US008713994B2

(12) United States Patent
Makino

(10) Patent No.: US 8,713,994 B2
(45) Date of Patent: May 6, 2014

(54) METHODS FOR CHECKING LEAKS FROM FUEL VAPOR TREATING APPARATUSES

(75) Inventor: Katsuhiko Makino, Aichi-ken (JP)

(73) Assignee: Aisan Kogyo Kabushiki Kaisha, Obu-Shi, Aichi-Ken (JP)

( * ) Notice: Subject to any disclaimer, the term of this patent is extended or adjusted under 35 U.S.C. 154(b) by 313 days.

(21) Appl. No.: 13/161,041

(22) Filed: Jun. 15, 2011

(65) Prior Publication Data

US 2011/0308302 A1 Dec. 22, 2011

(30) Foreign Application Priority Data

Jun. 17, 2010 (JP) ................................ 2010-137989

(51) Int. Cl.
*G01M 3/04* (2006.01)
*G01M 3/34* (2006.01)

(52) U.S. Cl.
USPC ................... 73/49.7; 73/40; 73/49.2; 73/49.3

(58) Field of Classification Search
USPC .......................... 73/40.7, 40, 49.7, 49.2, 49.3
See application file for complete search history.

(56) References Cited

U.S. PATENT DOCUMENTS 5,679,890 A * 10/1997 Shinohara et al. ......... 73/114.39
6,986,341 B2 * 1/2006 Mitani et al. .................. 123/520
2007/0044549 A1 3/2007 Yoshioka et al.

FOREIGN PATENT DOCUMENTS

EP 1734248 A1 12/2006
JP 2001294052 10/2001
JP 2001294052 A 10/2001
JP 2002235608 8/2002
JP 2002235608 A 8/2002
JP 2002256988 9/2002
JP 2003148257 5/2003
JP 2003148257 A 5/2003
JP 2005069047 3/2005
JP 2005299394 10/2005

OTHER PUBLICATIONS

Japanese Office Action mailed Jul. 30, 2013, corresponding to Japanese Patent Application No. 2010-137989; with English language translation.

* cited by examiner

*Primary Examiner* — Daniel S Larkin
*Assistant Examiner* — Jamar Ray
(74) *Attorney, Agent, or Firm* — Ladas & Parry LLP

(57) ABSTRACT

A method for detecting leak from a fuel vapor treating apparatus defining a first area including a fuel tank and a second area including an adsorbent canister has hermetically closing the first area, measuring internal pressure of the first area, comparing an absolute value of differential pressure between the internal pressure of the first area and the atmospheric pressure with a predetermined value, measuring the internal pressure of the first area in a case that the absolute value is equal to or higher than the predetermined value in order to check for leaks from the first area based on changes in the internal pressure of the first area, fluidly communicating the first area with the second area in order to equilibrate internal pressures of the first area and the second area, hermetically closing the second area, and measuring the internal pressure of the second area in order to check for leaks from the second area based on changes in the internal pressure of the second area.

7 Claims, 15 Drawing Sheets

METHODS FOR CHECKING LEAKS FROM FUEL VAPOR TREATING APPARATUSES

CROSS-REFERENCES TO RELATED APPLICATIONS

This application claims priority to Japanese patent application serial number 2010-137989, the contents of which are incorporated herein by reference.

BACKGROUND OF THE INVENTION

1. Field of the Invention

This disclosure relates to fuel vapor treating apparatuses each having a leak detection system, in particular, to fuel vapor treating apparatuses capable of checking for leaks while an engine is not running, and methods for checking for leaks.

2. Description of the Related Art

A gas vehicle is generally provided with a fuel vapor treating apparatus for preventing fuel vapor from releasing into the atmosphere while preventing breakage of a fuel tank caused by pressure increase therein. In a case that the fuel vapor treating apparatus has a crack, seal leakage or the like, the fuel vapor leaks from the fuel vapor treating apparatus. However, a driver cannot directly recognize such leaks of the fuel vapor. In order to solve such problem, a leak detection system for detecting leakage of the fuel vapor from the fuel vapor treating apparatus is disclosed in Japanese Laid-Open Patent Publication No. 2001-294052.

The fuel vapor treating apparatus disclosed in Japanese Laid-Open Patent Publication No. 2001-294052 is configured as an evapo-purge system where an adsorbent canister and an air intake pipe for an engine are connected with each other such that fuel vapor trapped in the adsorbent canister is purged to the engine due to negative pressure generated in the engine. In addition, the leak detection system has a valve capable of blocking communication between the fuel tank and the adsorbent canister such that the fuel vapor treating apparatus is divided into a first area including the fuel tank and a second area including the adsorbent canister, a first pressure sensor for measuring internal pressure of the first area and a second pressure sensor for measuring internal pressure of the second area. When an absolute value of differential pressure between the internal pressure of the first area (mainly, the fuel tank) and the atmospheric pressure is equal to or higher than a predetermined value, check for leaks form the first area (mainly, the fuel tank) is performed based on internal pressure behavior of the first area that is hermetically closed in a sealed manner by closing the valve. On the other hand, when the absolute value is lower than the predetermined value, negative pressure generated in the engine is applied to the whole fuel vapor treating apparatus including the adsorbent canister and the fuel tank and then check for leaks is performed.

Japanese Laid-Open Patent Publication No. 2002-235608 discloses a fuel vapor treating apparatus equipped with an aspirator for generating negative pressure by using a portion of fuel discharged from a fuel pump. In the fuel vapor treating apparatus, the aspirator is connected with the fuel pump via a pressure regulator configured to control fuel pressure, and the canister is connected with a decompression chamber of the aspirator. Thus, negative pressure generated by supplying surplus fuel from the pressure regulator to the aspirator acts on the adsorbent canister, so that the fuel vapor trapped in the adsorbent canister is recovered to the fuel tank via the aspirator. Accordingly, the fuel vapor treating apparatus is configured as purgeless evaporation system for recovering the fuel vapor from the adsorbent canister to the fuel tank and not purging the fuel vapor to an intake pipe for an engine.

With respect to the fuel vapor treating apparatus disclosed in Japanese Laid-Open Patent Publication No. 2001-294052, because the internal pressure of the first area is utilized for checking for leaks from the first area when the differential pressure between the internal pressure of the first area and the atmospheric pressure is within the predetermined range, the fuel vapor treating apparatus can efficiently carry out such check. On the other hand, the fuel vapor treating apparatus checks for leaks from the second area including the adsorbent canister by utilizing negative pressure generated in the engine. Thus, the fuel vapor treating apparatus cannot detect leakage from the second area while the engine is not running. Thus, there has been need for improved leak detection systems.

SUMMARY OF THE INVENTION

One aspect of this disclosure includes a fuel vapor treating apparatus for a vehicle having a fuel tank. The fuel vapor treating apparatus has an adsorbent canister connected with the fuel tank, a separation valve configured to block connection between the adsorbent canister and the fuel tank in order to divide the fuel vapor treating apparatus into a first area and a second area, a first pressure sensor configured to measure internal pressure of the first area, a second pressure sensor configured to measure internal pressure of the second area, a control unit configured to (a) output signal for closing the separation valve in order to hermitically close the first area, (b) compare an absolute value of differential pressure between the internal pressure of the closed first area and the atmospheric pressure with a predetermined value, in a case that the absolute value is equal to or higher than the predetermined value, (c) check for leaks from the first area based on changes in the internal pressure of the first area, (d) output signal for opening the separation valve after check for leaks from the first area, (e) output signal for closing the separation valve after the internal pressures of the first and second areas are equilibrated, and (f) check for leaks from the second area based on changes in the internal pressure of the second area.

In accordance with this aspect, in the case that the absolute value is equal to or higher than the predetermined value, the internal pressure of the first area is transferred to the second area and is utilized for the leak testing in the second area. Thus, negative pressure generated in an engine is not required for the leak testing. Therefore, because the leak testing is carried out regardless of whether the engine is running, it is able to perform the leak testing at any time without limitation.

Another aspect of this disclosure includes a method for detecting leak from a fuel vapor treating apparatus defining a first area including a fuel tank and a second area including an adsorbent canister. The method includes hermetically closing the first area, measuring internal pressure of the first area, comparing an absolute value of differential pressure between the internal pressure of the first area and the atmospheric pressure with a predetermined value, and in a case that the absolute value is equal to or higher than the predetermined value, measuring the internal pressure of the first area in order to check for leaks from the first area based on changes in the internal pressure of the first area, fluidly communicating the first area with the second area in order to equilibrate internal pressures of the first area and the second area, hermetically closing the second area, and measuring the internal pressure of the second area in order to check for leaks from the second area based on changes in the internal pressure of the second area.

In accordance with this aspect, it is able to check leak from the fuel vapor treating apparatus without using any pressure source.

DETAILED DESCRIPTION OF THE PREFERRED EMBODIMENTS

Each of the additional features and teachings disclosed above and below may be utilized separately or in conjunction with other features and teachings to provide improved fuel vapor treating apparatus. Representative examples, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

Figure 1:
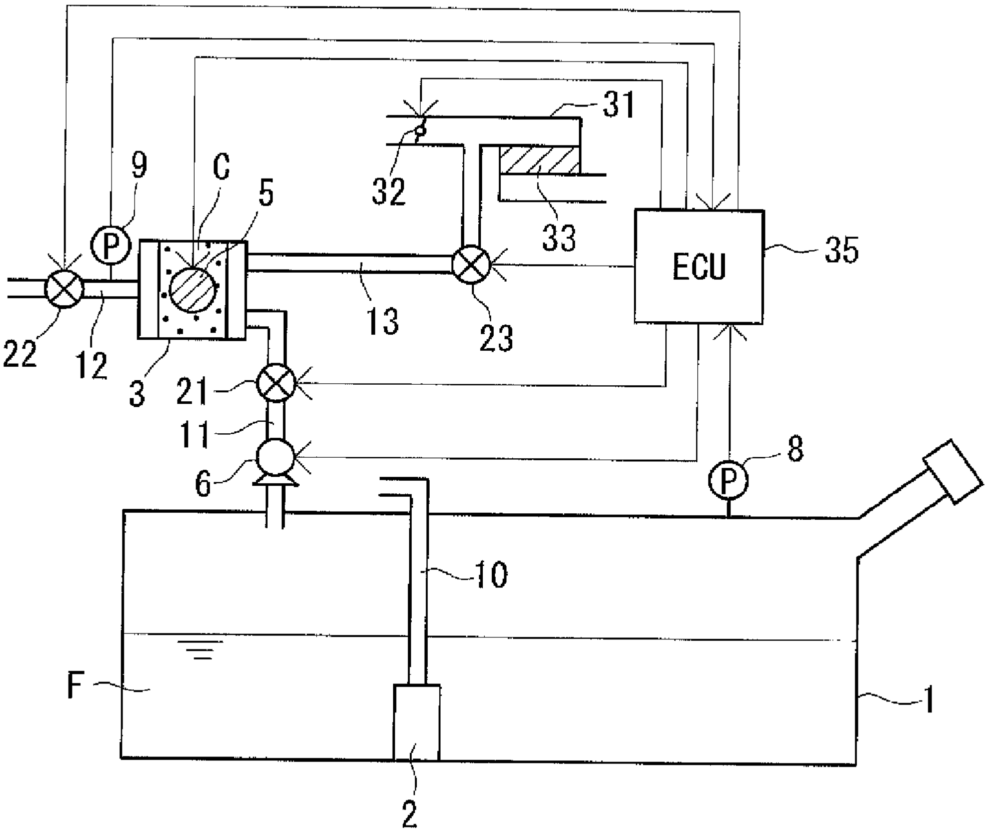
FIG. 1 is a schematic view of a fuel vapor treating apparatus having a leak detection system in a first embodiment.

A first embodiment of this disclosure will be described. In this embodiment, a fuel vapor treating apparatus is configured as evapo-purge system utilizing negative pressure generated in an engine and is equipped with a leak detection system. The fuel vapor treating apparatus is suitably mounted on a vehicle such as automobile utilizing highly volatile fuel (for example, gasoline). As shown in FIG. 1, the fuel vapor treating apparatus has a fuel tank 1 for reserving liquid fuel F therein, a fuel pump 2 for pumping the fuel F from the fuel tank 1 to an internal combustion engine (not shown), and an adsorbent canister 3 removably trapping fuel vapor vaporized in the fuel tank 1. The engine is connected to an air intake pipe 31 for providing ambient air to the engine. The air intake pipe 31 is provided with a throttle valve 32 for controlling the amount of air flowing into the engine depending on an angle of accelerator pedal, and an air filter 33. The air intake pipe 31 has an end open to the atmosphere.

The fuel tank 1 is configured as sealed tank. The fuel pump 2 is disposed in the fuel tank 1 and is configured to pump the fuel F to the engine through a fuel supply pipe 10. The adsorbent canister 3 is filled with an adsorbent C. For example, the adsorbent C is composed of activated carbon capable of selectively and removably adsorbing the fuel vapor. The adsorbent canister 3 is equipped with a heater 5 for heating the adsorbent C in the adsorbent canister 3. The adsorbent C adsorbs a smaller amount of the fuel vapor in a low temperature condition and adsorbs a larger amount of the fuel vapor in a high temperature condition. Thus, the high temperature condition is preferable for desorbing the fuel vapor from the adsorbent C. However, when the fuel vapor desorbs from the adsorbent C, the temperature of the adsorbent C decreases due to vaporization heat of the fuel vapor. Accordingly, it is able to improve desorption efficiency of the fuel vapor by heating the adsorbent C by the heater 5.

The fuel tank 1 and the adsorbent canister 3 are connected with each other via a first vapor pipe 11. The first vapor pipe 11 is provided with a first vapor pipe valve 21 as a switching means for switching between a communicating condition and a shut-off condition of the first vapor pipe 11, and a vacuum pump 6 as pumping means for flowing gas from the adsorbent canister 3 to the fuel tank 1. The vacuum pump 6 corresponds to a pressure source of this disclosure and has an advantage that it is able to apply pressure regardless of whether the engine is running. The adsorbent canister 3 is connected to an air communication pipe 12 having an end open to the atmosphere. The air communication pipe 12 is provided with an air communication pipe valve 22 as a switching means for switching between a communicating condition and a shut-off condition of the air communication pipe 12. The adsorbent canister 3 and the air intake pipe 31 are connected with each other via a purge pipe 13. The purge pipe 13 is provided with a purge pipe valve 23 as a switching means for switching between a communicating condition and a shut-off condition of the purge pipe 13.

When the first vapor pipe valve 21 is closed, the fuel vapor treating apparatus is divided into a first area including the fuel tank 1 and a second area including the adsorbent canister 3. Thus, the first vapor pipe valve 21 corresponds to a separation valve of this disclosure. The first area is composed of the fuel tank 1, and a portion of the first vapor pipe 11 between the fuel tank 1 and the first vapor pipe valve 21. On the other hand, the second area is composed of the adsorbent canister 3, a portion of the first vapor pipe 11 between the adsorbent canister 3 and the first vapor pipe valve 21, a portion of the air communication pipe 12 between the adsorbent canister 3 and the air communication pipe valve 22, and a portion of the purge pipe 13 between the adsorbent canister 3 and the purge pipe valve 23. The fuel tank 1 is provided with a first pressure sensor 8 as a first internal pressure detecting means for measuring internal pressure of the first area including the fuel tank 1. Whereas, the air communication pipe 12 is provided between the air communication pipe valve 22 and the adsorbent canister 3 with a second pressure sensor 9 as a second internal pressure detecting means for measuring internal pressure of the second area including the adsorbent canister 3.

The first and second pressure sensors 8, 9 output signals to an engine control unit (ECU) 35. The ECU 35 has a central processing unit (CPU), a read-only memory (ROM) and a random access memory (RAM), etc. The ECU 35 is programmed to control all components of the fuel vapor treating system such as the heater 5 and the vacuum pump 6. Each of the first vapor pipe valve 21, the air communication pipe valve 22 and the purge pipe valve 23 is composed of a solenoid valve controlled by the ECU 35.

Here, a process for treating the fuel vapor by the fuel vapor treating apparatus will be described. In the process, the ECU 35 controls all components of the fuel vapor treating apparatus. In a normal condition, the air communication pipe valve 22 is open, whereas the first vapor pipe valve 21 and the purge pipe valve 23 are closed. For refueling, the first vapor pipe valve 21 is opened. And, when fuel temperature increases due to influence of ambient temperature during parking and the first pressure sensor 8 detects higher internal pressure of the fuel tank 1 than a first predetermined value (for example, 5 kPa) or when the engine is started, the first vapor pipe valve 21 is opened. Then, fuel vapor-containing gas flows from the fuel tank 1 through the first vapor pipe 11 into the adsorbent canister 3, and the fuel vapor in the gas is selectively adsorbed onto the adsorbent C filled in the adsorbent canister 3. The remaining gas substantially composed of air flows through the adsorbent canister 3 and the air communication pipe 12 and is released into the atmosphere. Accordingly, it is possible to reduce the internal pressure of the fuel tank 1 in order to prevent breakage of the fuel tank 1 without air pollution. After that, when the first pressure sensor 8 detects lower internal pressure of the fuel tank 1 than a second predetermined value (for example, near the atmospheric pressure) or when the engine is stopped, the first vapor pipe valve 21 is closed.

When the engine starts, the purge pipe valve 23 is opened. So, negative pressure generated in the engine acts on the adsorbent canister 3 via the purge pipe 13. Thus, the fuel vapor trapped in the adsorbent canister 3 is removed and purged into the air intake pipe 31 through the purge pipe 13. In this state, ambient air flows into the adsorbent canister 3 through the air communication pipe 12 as desorption gas. In addition, when the purge pipe valve 23 is opened, the heater 5 is simultaneously activated. Thus, because the temperature of the adsorbent C is increased by the heater 5, desorption of the fuel vapor from the adsorbent C is facilitated.

Figure 2:
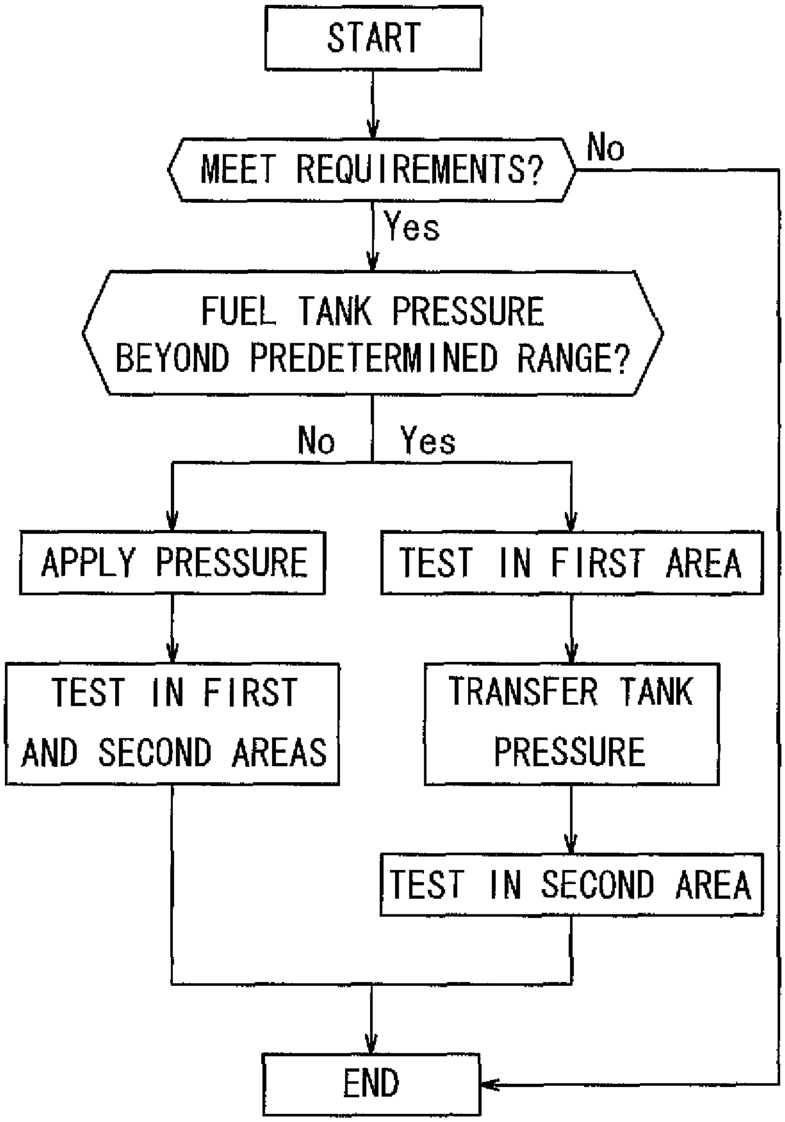
FIG. 2 is a flow chart for leak testing.

Next, leak testing for the fuel vapor treating apparatus will be described. The ECU 35 is programmed to carry out the leak testing and to control components during the leak testing. FIG. 2 is a flow chart for the leak testing. As shown in FIG. 2, when meeting requirements for the leak testing, the first pressure sensor 8 measures the internal pressure of the first area including the fuel tank 1. The leak testing of this embodiment is not directly affected by engine, so that the requirements for the leak testing can be arbitrarily selected from various conditions such as during parking, during driving, during idling, or after a predetermined period from ON operation of an ignition switch or a starter. When an absolute value of differential pressure between the internal pressure of the first area and the atmospheric pressure is below a predetermined value, i.e., the internal pressure of the first area is within a predetermined range, the vacuum pump 6 applies pressure on the first and second areas and then the leak testing is carried out as described in a left course in FIG. 2. On the other hand, when the absolute value of the differential pressure between the internal pressure of the first area and the atmospheric pressure is equal to or higher than the predetermined value, i.e., the internal pressure of the first area is beyond the predetermined range, leak from the first area is checked and then the internal pressure of the first area (in detail, gas in the first area) is transferred to the second area, after that leak from the second area is checked. Such predetermined value (criterion) for determining process for leaks testing is set lower than a criterion for depressurizing the fuel tank 1. If the criterion for depressurizing the fuel tank 1 is higher than that for determining process for the leak testing, the first vapor pipe valve 21 is opened during the leak testing such that the first area and the second area are communicated with each other. For example, when the criterion for decompressing the fuel tank 1 is set at 5 kPa, the criterion for the leak testing is set at 3 kPa. In this case, when the internal pressure is above −3 kPa and below +3 kPa relative to the atmospheric pressure, the absolute value of the differential pressure between the internal pressure of the first area and the atmospheric pressure is lower than the predetermined value. On the other hand, when the internal pressure of the first area is equal to or lower than −3 kPa or equal to or higher than +3 kPa relative to the atmospheric pressure, the absolute value of the differential pressure between the internal pressure of the first area and the atmospheric pressure is equal to or higher than the predetermined value. The leak testing in the state that the absolute value of the differential pressure between the internal pressure of the first area and the atmospheric pressure is equal to or higher than the predetermined, value and the leak testing in the state that the absolute value of the differential pressure between the internal pressure of the first area and the atmospheric pressure is lower than the predetermined value will be described separately.

Figure 3:
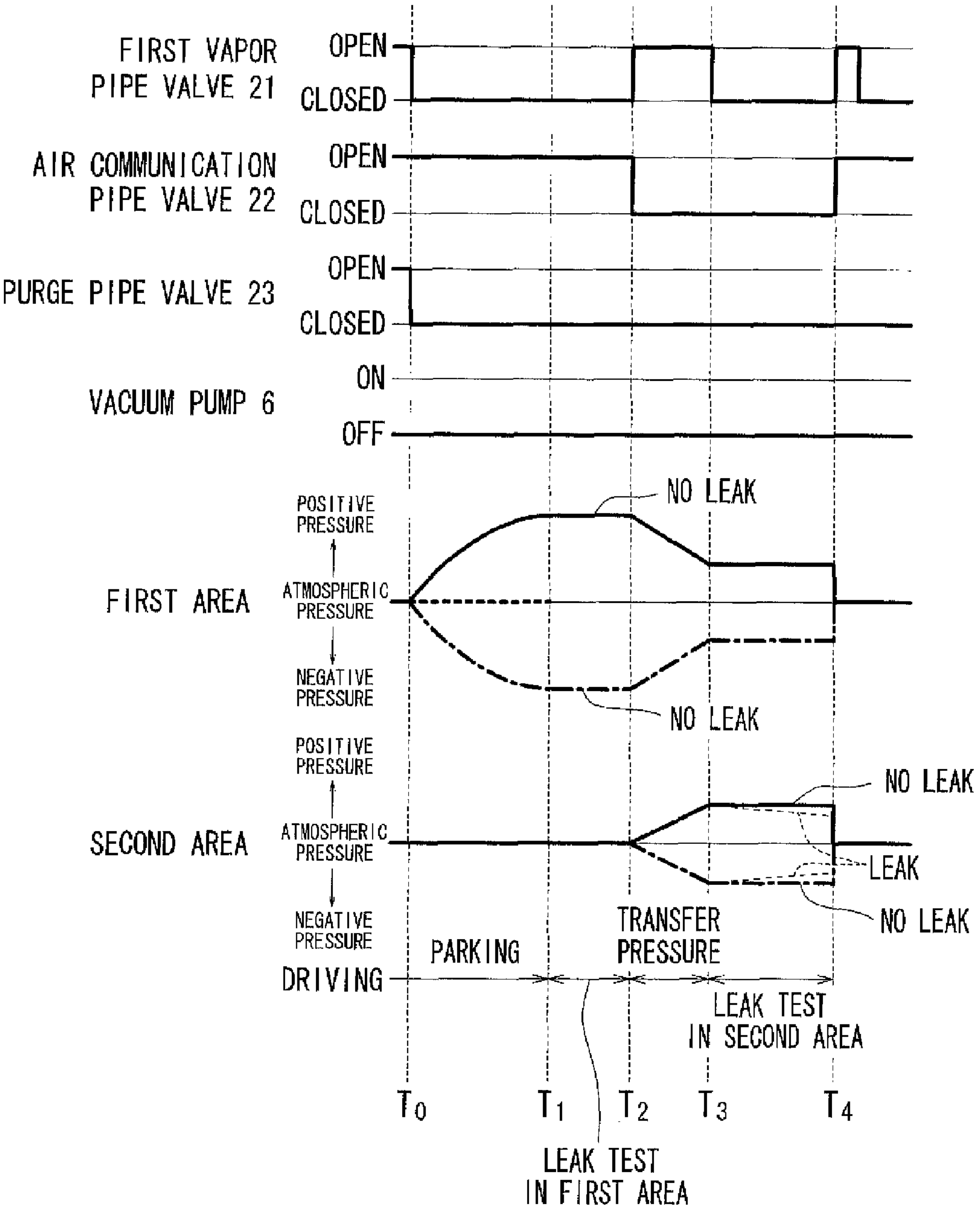
FIG. 3 is a graph showing changes in internal pressures and valve opening-closing timings during the leak testing in a condition that internal pressure of a fuel tank is beyond a predetermined range in the first embodiment.

The case that the internal pressure of the first area is beyond the predetermined range will be described. FIG. 3 shows changes in the internal pressures and valve opening-closing timings during the leak testing where the internal pressure of the first area including the fuel tank 1 is beyond the predetermined range. As shown in FIG. 3, the first vapor pipe valve 21, the air communication pipe valve 22 and the purge pipe valve 23 are open during driving. When the vehicle is parked, the first vapor pipe valve 21 and the purge pipe valve 23 are closed (point T0). Thus, the fuel vapor treating apparatus is separately divided into the first area including the fuel tank 1 and the second area including the adsorbent canister 3. In this state, the first area is hermetically closed, whereas because the air communication pipe valve 22 is open, the second area is open to the atmosphere. Temperature of the fuel F is increased due to influences of ambient temperature or the like. Increase in the fuel temperature facilitates vaporization of the fuel, thereby increasing the internal pressure of the fuel tank 1 (substantially corresponding to the internal pressure of the first area) as shown by solid line in FIG. 3. On the other hand, when the fuel temperature decreases, the vaporization of the fuel also decreases, so that the internal pressure of the fuel, tank 1 may sometimes become negative pressure (dashed-dotted line in FIG. 3).

In a condition that the requirements for the leak testing are met (at point T1), when the first pressure sensor 8 measures internal pressure of the first area and the ECU 35 concludes that an absolute value of differential pressure between the internal pressure measured by the first pressure sensor 8 and the atmospheric pressure higher than the predetermined value, the ECU 35 checks for leaks from the first section based on changes the internal pressure of the first area. That is, when the first pressure sensor 8 keeps detecting a constant value of the internal pressure during a predetermined period of time while the first area is hermetically closed, the ECU 35 concludes that there is no leak (period between T1 and T2). On the other hand, if there is leak from the first area caused by a crack or the like, the internal pressure of the first area is usually equal to the atmospheric pressure (although there may be slight changes in pressure) as shown by a dashed line in FIG. 3. However, in a case that the fuel temperature has little change during parking, the internal pressure of the first area may be equal to the atmospheric pressure. Accordingly, it is impossible to conclude that there is a leak from the first area at this point. In this case, the ECU 35 checks for leaks from the first area in accordance with another process described later.

When the leak testing for the first area is completed, the ECU 35 outputs signals for opening the first vapor pipe valve 21 and closing the air communication pipe valve 22 (point T2) in order to communicate the first area with the second area. So, the pressure in the first area is transferred to the second area such that the internal pressures of the first area and the second area are equilibrated. That is, positive pressure or negative pressure in the first area is applied to the second area due to difference between the internal pressures of the first and second areas. After the internal pressure of the first area is transferred to the second area, the ECU 35 outputs signal for closing the first vapor pipe valve 21 such that the second area is hermetically closed (point T3). Then, the second pressure sensor 9 measures internal pressure of the second area hermetically closed, and the ECU 35 checks for leaks from the second area based on changes in the internal pressure of the second area. If there is no leak from the second area, the second pressure sensor 9 keeps detecting an equilibrated constant pressure. On the other hand, if there is leak from the second area, the internal pressure decreases in a case that the equilibrated pressure is positive, or the internal pressure increases in another case that the equilibrated pressure is negative, as shown by dashed lines in FIG. 3. After the leak testing for the second area is completed, the ECU 35 outputs signals for opening the air communication pipe valve 22 and the first vapor pipe valve 21 in order to release the internal pressures of the first and second areas (point T4). After releasing the internal pressures of the first and second areas, the ECU 35 outputs signal for closing the first vapor pipe valve 21.

Figure 4:
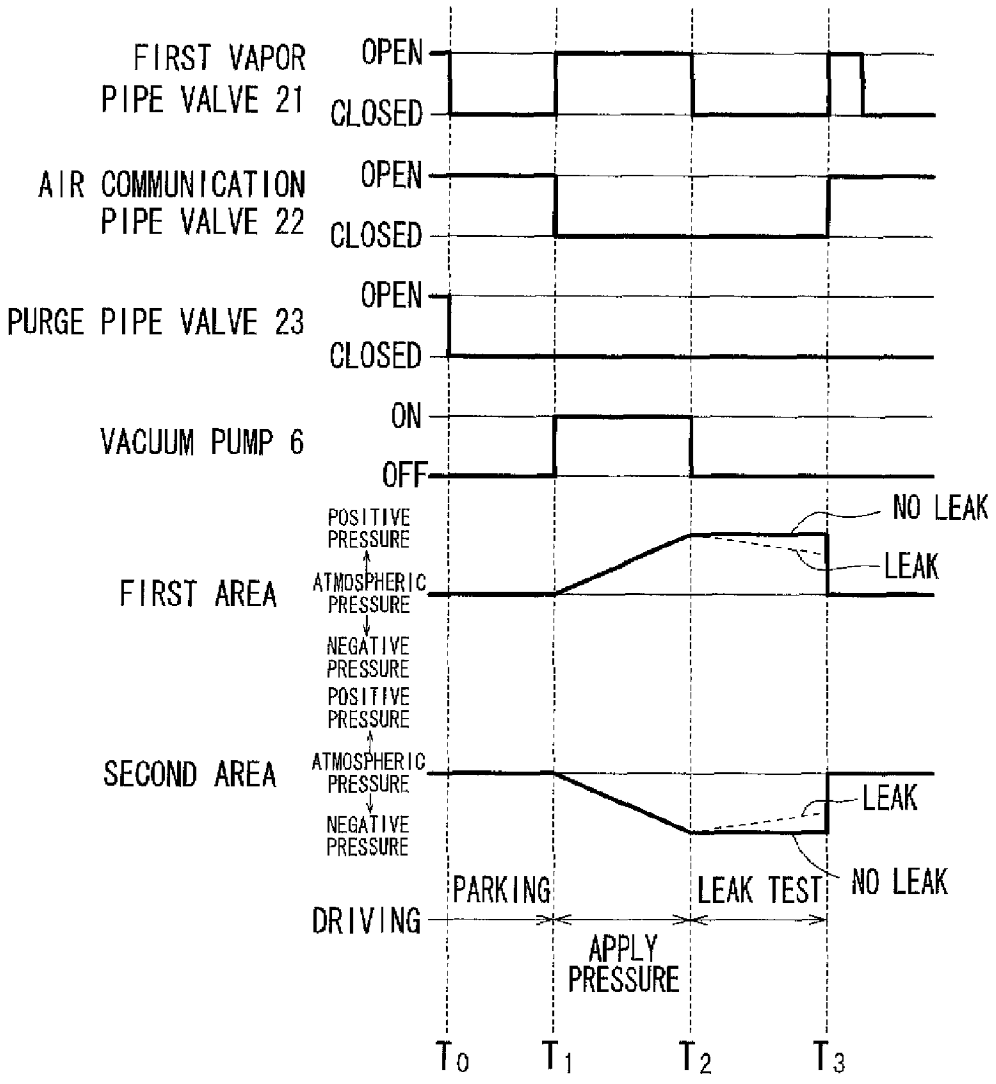
FIG. 4 is a graph showing changes in the internal pressures and valve opening-closing timings during the leak testing in a condition that the internal pressure of the fuel tank is within the predetermined range in the first embodiment.

Next, a case that the internal pressure of the first area 1 is within the predetermined range will be described. FIG. 4 shows changes in the internal pressures and valve opening-closing timings during the leak testing where the internal pressure of the first area including the fuel tank 1 is within the predetermined range. As shown in FIG. 4, the first vapor pipe valve 21, the air communication pipe valve 22 and the purge pipe valve 23 are closed during driving. When the vehicle is parked, the ECU 35 outputs signals for closing the first vapor pipe valve 21 and the purge pipe valve 23 (point T0). In this state, the fuel vapor treating apparatus is separately divided into the first area including the fuel tank 1 and the second area including the adsorbent canister 3. The first area is hermetically closed, whereas because the air communication pipe valve 22 is open, the second area is open to the atmosphere. In the condition that the requirements for the leak testing are met (point T1), when the first pressure sensor 8 measures internal pressure of the first area hermetically closed and the ECU 35 concludes that the absolute value of the differential pressure between the internal pressure of the first area and the atmospheric pressure is lower than the predetermined value, i.e., the internal pressure of the first area is near the atmospheric pressure (although there may be slight changes in pressure), the ECU 35 outputs signal for opening the first vapor pipe valve 21 (point T1). Simultaneously, the ECU 35 outputs signals for activating the vacuum pump 6 and for closing the air communication pipe valve 22. Thus, the activated vacuum pump 6 makes gas flow from the canister 3 to the fuel tank 1, so that positive pressure is applied to the first area and negative pressure is applied to the second area (period between T1 and T2).

After pressure is sufficiently applied to the first and second areas, the ECU 35 outputs signals for stopping the vacuum pump 6 and for closing the first vapor pipe valve 21 such that the first area and the second area are separately and hermetically closed (point T2). In this state, the first pressure sensor 8 measures the internal pressure of the first area and the second pressure sensor 9 measures the internal pressure of the second area, and the ECU 35 checks for leaks based on changes in the measured internal pressures. If there is no leak from the first and second areas, the applied pressures are kept as shown by solid lines in FIG. 4. On the other hand, if there is leak from the first area, the internal pressure of the first area decreases as shown by dashed line in FIG. 4. If there is leak from the second area, the internal pressure of the second area increases as shown by dashed line in FIG. 4. After the leak testing is completed, the first vapor pipe valve 21 and the air communication pipe valve 22 are opened in order to release the pressures (point T3). After releasing the internal pressures of the first and second areas, the first vapor pipe valve 21 is closed. In this embodiment, because the vacuum pump 6 simultaneously applies pressures to the first and second areas, it is able to carry out the leak testing efficiently. In addition, the vacuum pump 6 merely flows gas from the second area to the first area, so that it is able to apply required pressure for a shorter time than an apparatus configured to apply negative pressure to the whole fuel vapor treating system. Furthermore, because gas does not flow into the fuel vapor treating system during pressure transfer, little gas flow out of the fuel vapor treating system during pressure release. Thus, it is able to substantially prevent the fuel vapor from releasing into the atmosphere during pressure release.

Figure 5:
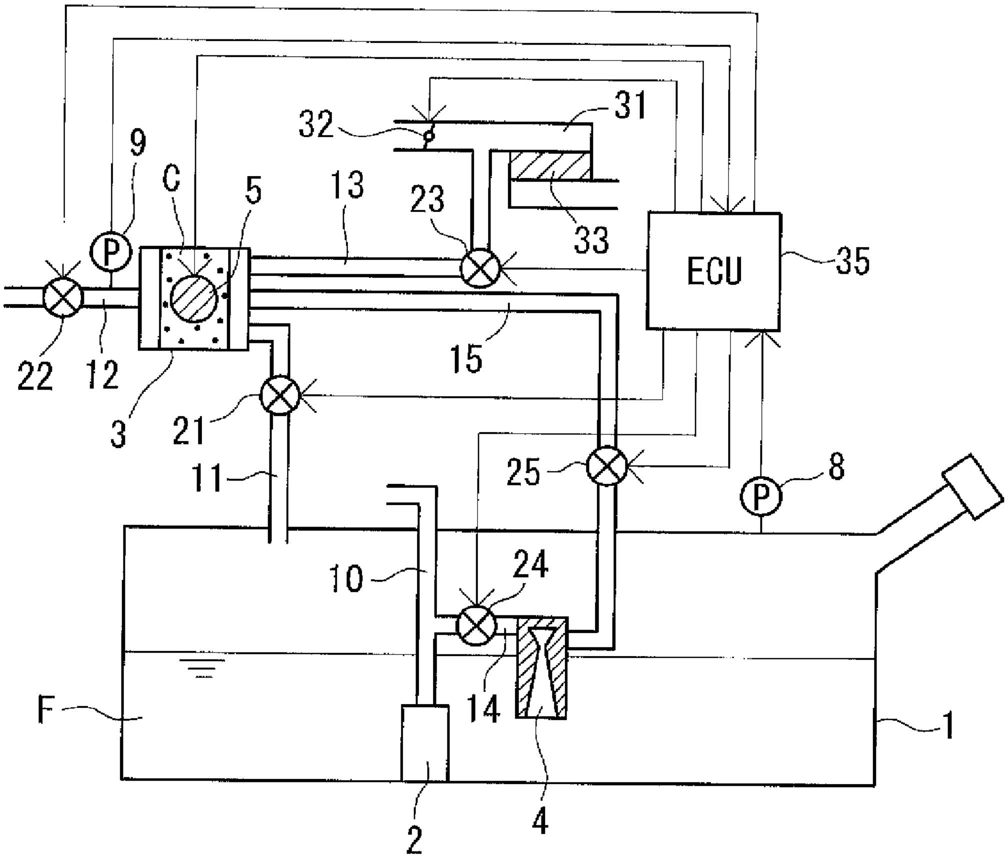
FIG. 5 is a schematic view of the fuel vapor treating apparatus having the leak detection system in a second embodiment.

A second embodiment will be described. FIG. 5 is a schematic view showing the fuel vapor treating apparatus having the leak detection system of the second embodiment. The second embodiment substantially corresponds to the first embodiment further having some changes, so that the changes will be mainly described. The second embodiment is also configured as the evapo-purge system that purges the fuel vapor to the air intake pipe 31 by using negative pressure generated in the engine. However, the second embodiment has an aspirator (jet pump) 4 that utilizes a portion of the fuel F discharged from the fuel pump 2 in order to generate negative pressure. There are advantages that the aspirator 4 does not need electric power and is generally smaller than the vacuum pump.

The fuel supply pipe 10 is connected to the aspirator 4 via a branch pipe 14 branching from the middle of the fuel supply pipe 10. The branch pipe 14 is provided with a fuel supply control valve 24 for switching a communication condition and a shut-off condition of the branch pipe 14 in order to control fuel supply to the aspirator 4. The aspirator 4 is connected to a recovery pipe 15 for communicating the aspirator 4 with the adsorbent canister 3. The recovery pipe 15 is provided with a recovery pipe valve 25 as switching means for switching a communicating condition and a shut-off condition of the recovery pipe 15. Each of the fuel supply control valve 24 and the recovery pipe valve 25 is composed of a solenoid valve controlled by the ECU 35. The fuel supply control valve 24 and the recovery pipe valve 25 are usually closed.

The first area including the fuel tank 1 and the second area including the adsorbent canister 3 are separately divided from each other by the first vapor pipe valve 21 and the recovery pipe valve 25. Thus, each of the first vapor pipe valve 21 and the recovery pipe valve 25 corresponds to the separation valve of this disclosure. The first area is composed of the fuel tank 1, a portion of the first vapor pipe valve 21 between the fuel tank 1 and the first vapor pipe valve 21, the aspirator 4, a portion of the branch pipe 14 between the aspirator 4 and the fuel supply control valve 24, and a portion of the recovery pipe 15 between the aspirator 4 and the recovery pipe valve 25. Whereas, the second area is composed of the adsorbent canister 3, a portion of the first vapor pipe 11 between the first vapor pipe valve 21 and the adsorbent canister 3, a portion of the air communication pipe 12 between the adsorbent canister 3 and the air communication pipe valve 22, a portion of the purge pipe 13 between the adsorbent canister 3 and the purge pipe valve 23, and a portion of the recovery pipe 15 between the adsorbent canister 3 and the recovery pipe valve 25.

Figure 6:
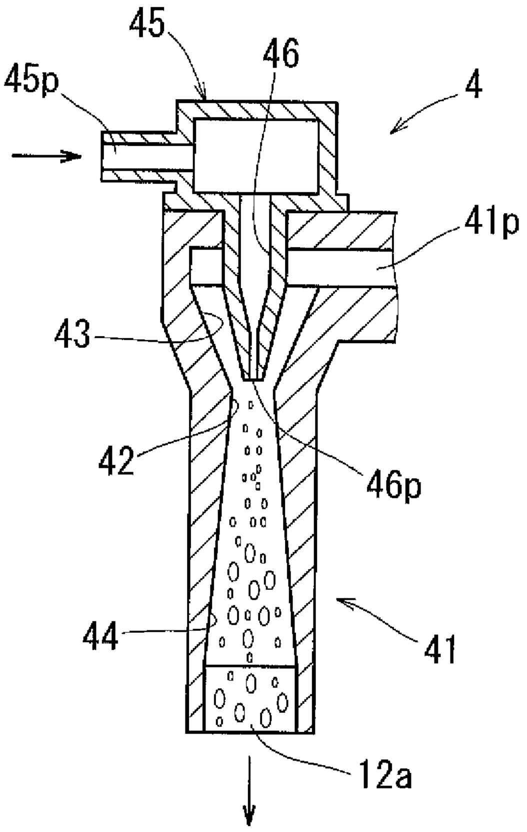
FIG. 6 is a vertical cross-sectional view of an aspirator.

As shown in FIG. 6, the aspirator 4 has a venturi part 41 and a nozzle part 45. The venturi part 41 has a constricted portion 42, a tapered decompression chamber 43 positioned upstream of the constricted portion 42 in a fuel flow direction, a diffuser portion 44 that is positioned downstream of the constricted portion 42 and is configured to become wider along the fuel flow direction, and a suction port 41*p*. The decompression chamber 43, the constricted portion 42 and the diffuser portion 44 are disposed concentrically. The suction port 41*p* is communicated with the decompression chamber 43. The suction port 41*p* is connected with the recovery pipe 15. The nozzle part 45 is located upstream of the venturi part 41. The nozzle part 45 has a fuel intake port 45*p* for introducing the fuel into the aspirator 4 and a nozzle body 46 for injecting supplied fuel. The fuel intake port 45*p* is connected with the branch pipe 14. The nozzle body 46 is concentrically inserted into the decompression chamber 43 such that an inject orifice 46*p* of the nozzle body 46 is positioned near the constricted portion 42.

Some of the fuel F discharged from the fuel pump 2 is supplied into the aspirator 4 through the fuel supply pipe 10, the branch pipe 14 and the fuel intake port 45*p*. Then, the supplied fuel F is injected from the nozzle body 46 and flows through the constricted portion 42 and the diffuser portion 44 in the axial direction at high speeds. In this state, negative pressure is generated in the decompression chamber 43 due to venturi effect. Thus, it is able to provide suction power acting on the suction port 41*p* and the recovery pipe 15. Accordingly, gas (i.e., fuel vapor and air) in the recovery pipe 15 and the adsorbent canister 3 is suctioned into the decompression chamber 43 through the suction port 41*p* and is discharged from the diffuser portion 44 together with the fuel F injected from the nozzle body 46. The aspirator 4 corresponds to the pressure source of this disclosure.

In the second embodiment, the aspirator 4 does not relate to fuel vapor treatment, and the fuel vapor is treated in the same manner as the first embodiment. During treating the fuel vapor, the fuel supply control valve 24 and the recovery pipe valve 25 are closed.

Figure 7:
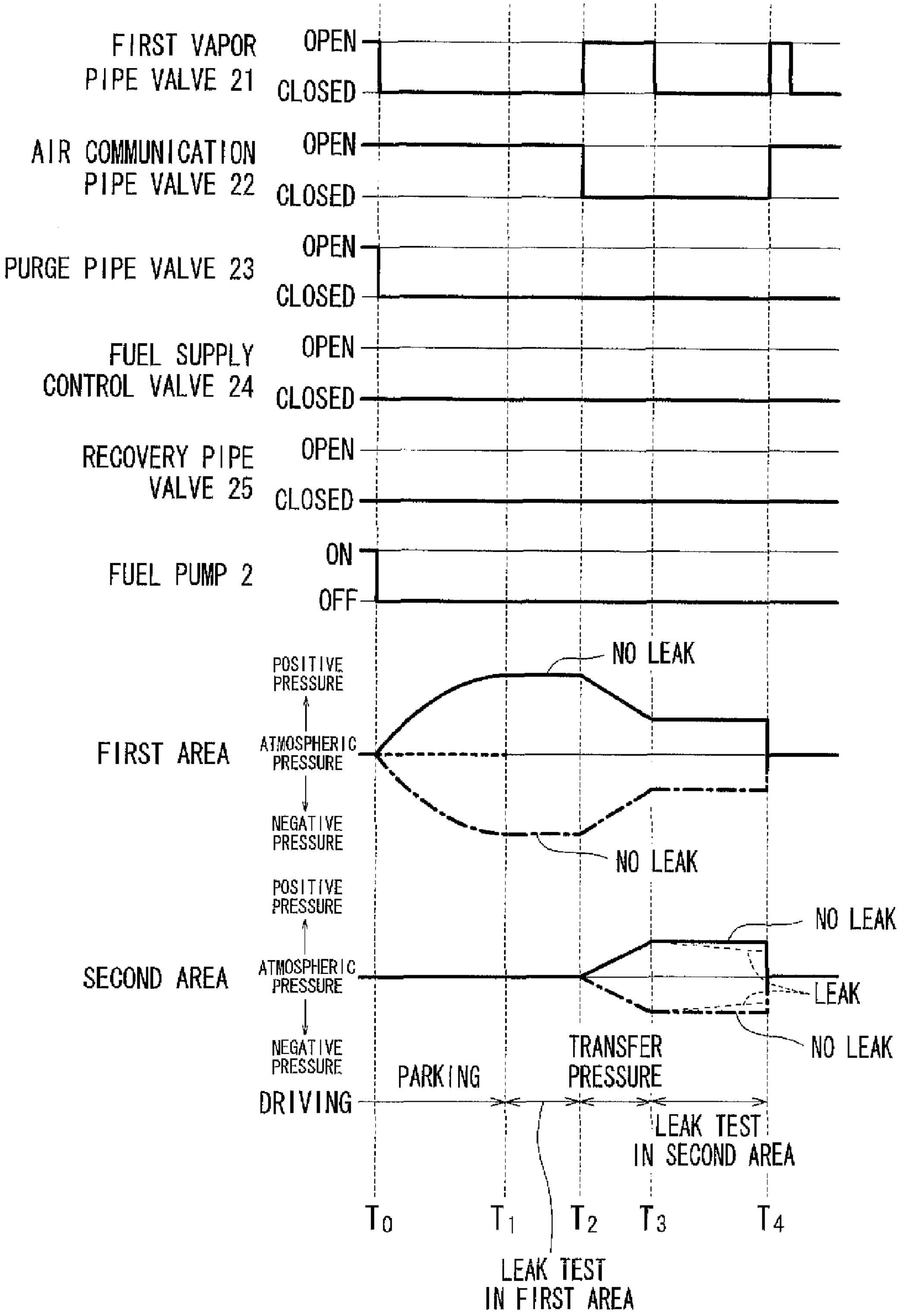
FIG. 7 is a graph showing changes in the internal pressures and valve opening-closing timings during the leak testing in a condition that the internal pressure of the fuel tank is beyond the predetermined range in the second embodiment.

In the second embodiment, the leak testing is carried out according to the flow chart in FIG. 2 in the same manner as the first embodiment. When the absolute value of the differential pressure between the internal pressure of the first area (including the fuel tank 1) and the atmospheric pressure is equal to or higher than the predetermined value, the ECU 35 outputs signals for closing the fuel supply control valve 24 and the recovery pipe valve 25 as shown in FIG. 7 and the ECU 35 checks for leaks in the same manner as the first embodiment.

Figure 8:
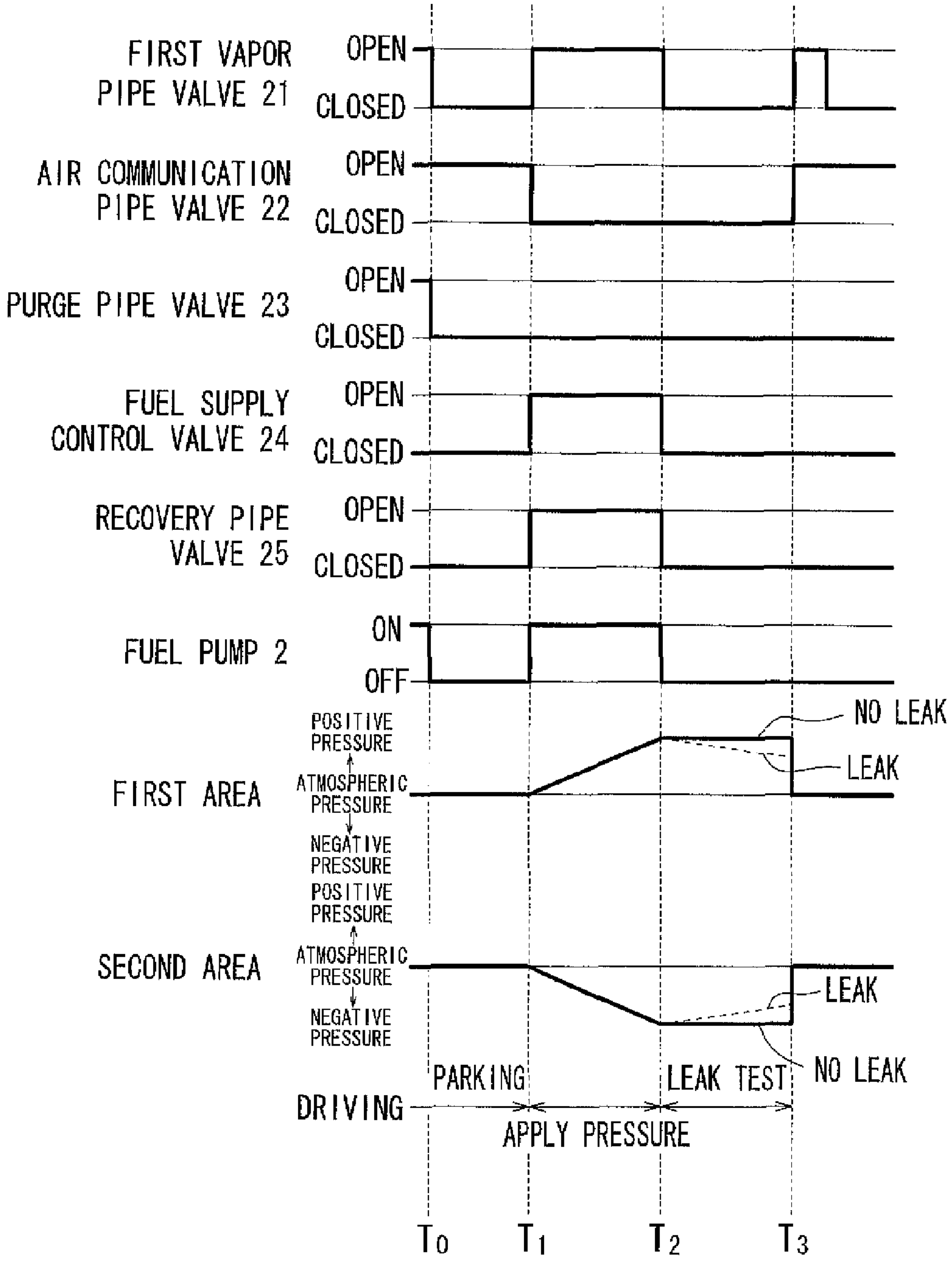
FIG. 8 is a graph showing changes in the internal pressures and valve opening-closing timings during the leak testing in a condition that the internal pressure of the fuel tank is within the predetermined range in the second embodiment.

A case that the internal pressure of the first area is within the predetermined range in the second embodiment will be described. FIG. 8 shows changes in the internal pressures and valve opening-closing timings during the leak testing in the case that the internal pressure of the first area is within the predetermined range. As shown in FIG. 8, opening-closing timings for the first vapor pipe valve 21, the air communication pipe valve 22 and the purge pipe valve 23 in the second embodiment are same as those in the first embodiment. When the vehicle is parked, the fuel pump 2 is stopped (point T0). In this state, because the first vapor pipe valve 21 and the recovery pipe valve 25 are closed, the first area is hermetically closed. Whereas, because the air communication pipe valve 22 is open, the second area is open to the atmosphere. In the condition that the requirements for the leak testing are met (point T1), when the first pressure sensor 8 measures internal pressure of the first area and the ECU 35 concludes that the absolute value of the differential pressure between the internal pressure of the first area and the atmospheric pressure is lower than the predetermined value, i.e., is near the atmospheric pressure, the ECU 35 outputs signal for activating the fuel pump 2 (point T1). In this state, because the engine is not running, surplus fuel pumped from the fuel pump 2 is returned from a pressure regulator (not shown) into the fuel tank 1. Simultaneously, the ECU 35 outputs signals for opening the fuel supply control valve 24 and the recovery pipe valve 25. Then, some of the fuel F discharged from the fuel pump 2 flows through the fuel supply pipe 10 and the branch pipe 14 into the aspirator 4. Thus, negative pressure is generated in the aspirator 4 and acts on the adsorbent canister 3 via the recovery pipe 15. Accordingly, gas in the adsorbent canister 3 is suctioned into the aspirator 4 through the recovery pipe 15 and then is discharged into the fuel tank 1 together with the supplied fuel F. Therefore, the aspirator 4 applies positive pressure to the first area and applies negative pressure to the second area. When the pressures are sufficiently applied to the first and second areas, the ECU 35 outputs signals for closing the fuel supply control valve 24 and the recovery pipe valve 25 and for stopping the fuel pump 2 (point T2). Therefore, the first area and the second area are separately and hermetically closed, and the leak testing is carried out in the same manner as the first embodiment.

Figure 9:
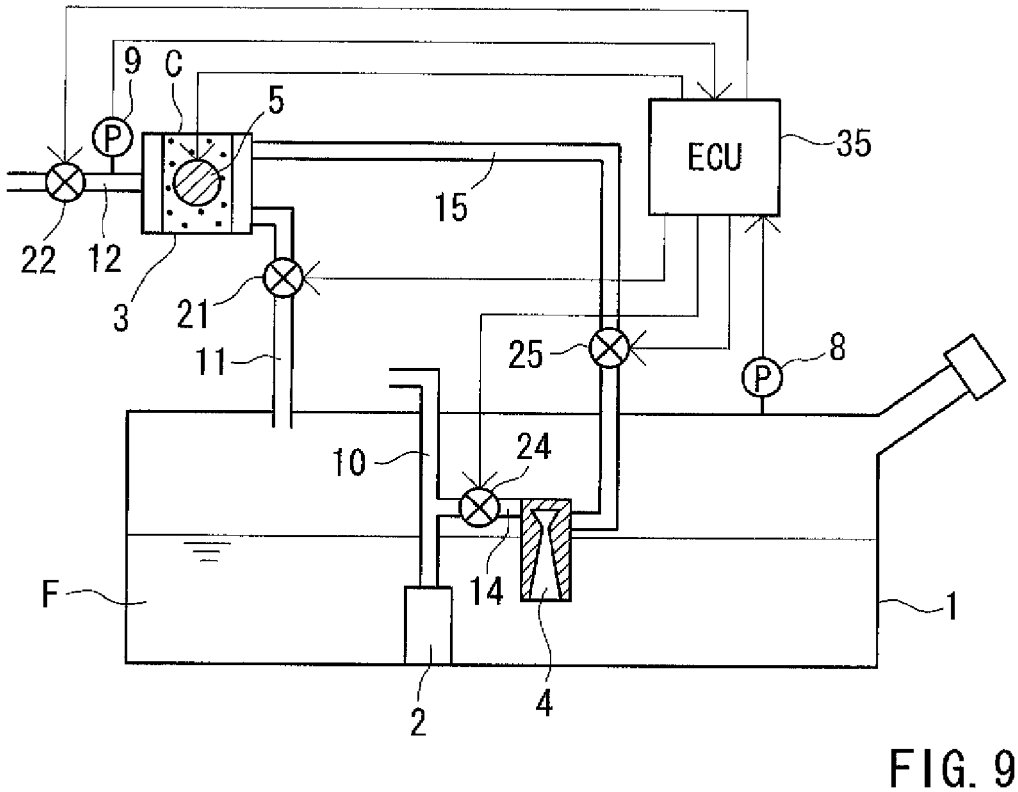
FIG. 9 is a schematic view of the fuel vapor treating apparatus having the leak detection system in a third embodiment.

A third embodiment will be described. FIG. 9 shows a schematic view showing the fuel vapor treating apparatus having the leak detection system of the third embodiment. The third embodiment has basic structures substantially same as those of the second embodiment, however is configured as purgeless evaporation system for recovering the fuel vapor into the fuel tank 1. Thus, as shown in FIG. 9, the fuel vapor treating apparatus of the third embodiment does not have the purge pipe, and the adsorbent canister 3 and the air intake pipe are not communicated with each other. The fuel vapor trapped in the adsorbent canister 3 is returned into the fuel tank 1 through the recovery pipe 15 and the aspirator 4. Because the fuel vapor trapped in the adsorbent canister 3 is not purged into the air intake pipe, it is able to prevent disturbance of air-fuel ratio in the engine during purge operation.

When the internal pressure of the first area including the fuel tank 1 becomes equal to or higher than the predetermined value during refueling or during parking, the first vapor pipe valve 21 is opened in order to release pressure of the fuel tank 1 in the same manner as the first and second embodiments. On the other hand, during driving, when the fuel pump 2 is activated, the fuel supply control valve 24 and the recovery pipe valve 25 are opened. Thus, some of the fuel F discharged from the fuel pump 2 flows through the fuel supply pipe 10 and the branch pipe 14 into the aspirator 4. Accordingly, negative pressure is generated in the aspirator 4 and acts on the adsorbent canister 3 via the recovery pipe 15. Therefore, the fuel vapor is desorbed from the adsorbent C in the adsorbent canister 3 and is returned into the fuel tank 1 through the recovery pipe 15 and the aspirator 4. When the engine is stopped, the fuel supply control valve 24 and the recovery pipe valve 25 are closed, and thus generation of the negative pressure in the aspirator 4 stops.

Figure 10:
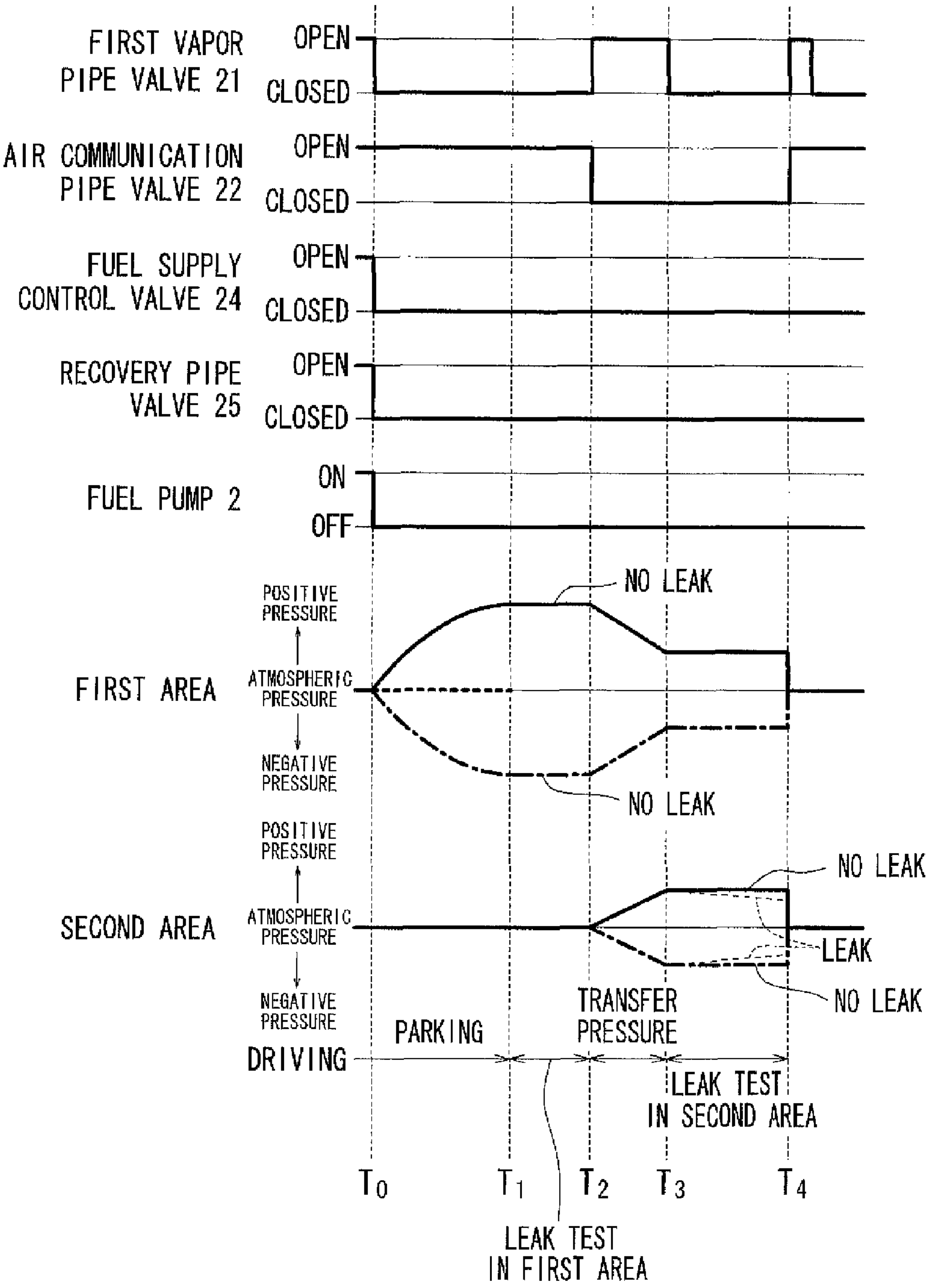
FIG. 10 is a graph showing changes in the internal pressures and valve opening-closing timings during the leak testing in a condition that the internal pressure of the fuel tank is beyond the predetermined range in the third embodiment.
Figure 11:
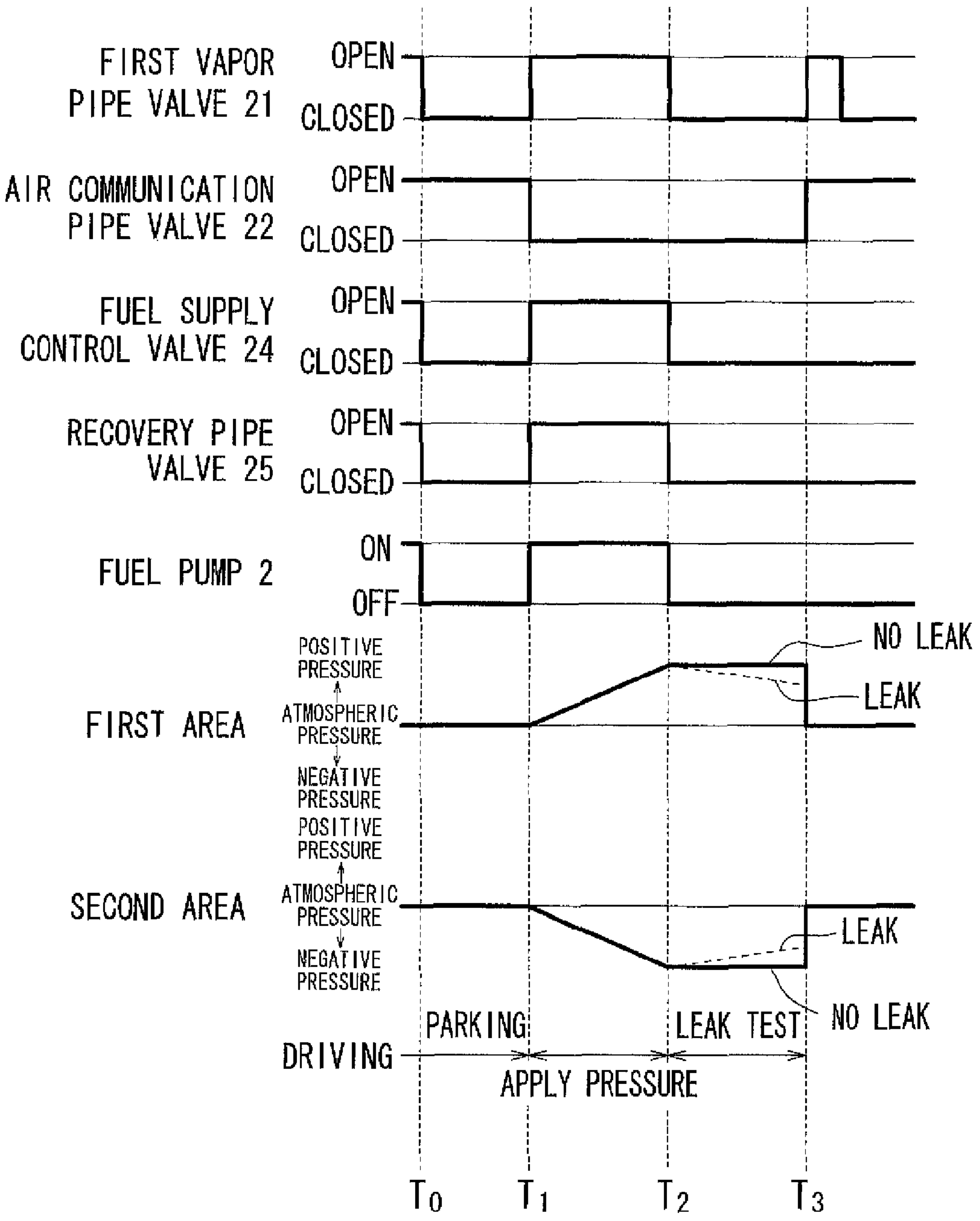
FIG. 11 is a graph showing changes in the internal pressures and valve opening-closing timings during the leak testing in a condition that the internal pressure of the fuel tank is within the predetermined range in the third embodiment.

In the third embodiment, the leak testing is carried out according to the flow chart shown in FIG. 2 in the same manner as the first and second embodiments. When the absolute value of the differential pressure between the internal pressure of the first area and the atmospheric pressure is equal to or higher than the predetermined value, the ECU 35 outputs signals for closing the fuel supply control valve 24 and the recovery pipe valve 25 during the leak testing (after point T1) as shown in FIG. 10, and the ECU 35 carries out the leak testing in the same manner as the first and second embodiments. In another case that the absolute value of the differential pressure between the internal pressure of the first area and the atmospheric pressure is lower than the predetermined value, the leak test is carried out by the ECU 35 in the same manner as the second embodiment as shown in FIG. 11.

Figure 12:
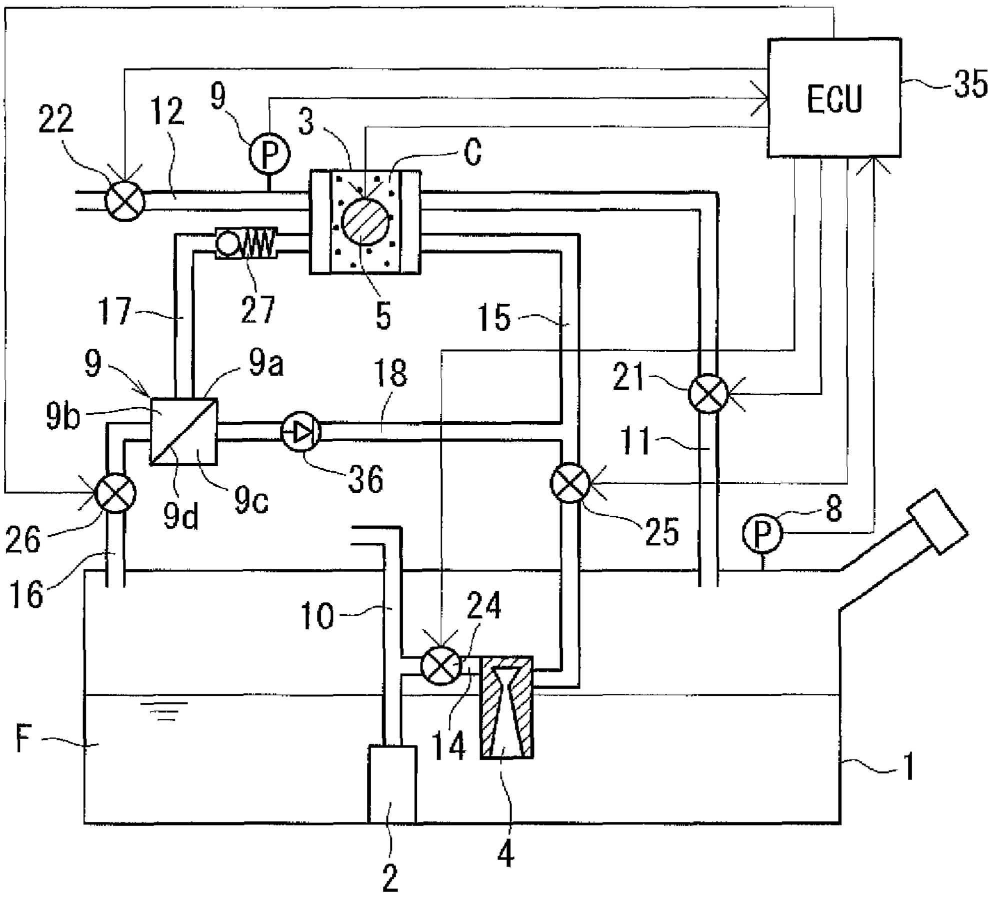
FIG. 12 is a schematic view of the fuel vapor treating apparatus having the leak detection system in a fourth embodiment.

A fourth embodiment will be described. FIG. 12 is a schematic view showing the fuel vapor treating apparatus having the leak detection system of the fourth embodiment. The fourth embodiment substantially corresponds to the third embodiment further having a separation membrane module capable of selectively separating specific components from mixed gas containing a plurality of gaseous components. Accordingly, changes from the third embodiment will be described mainly.

The fuel vapor treating apparatus of the fourth embodiment has a separation membrane module 9 as shown in FIG. 12. The separation module 9 has a sealed container 9*a* and a separation membrane 9*d* that divides an inner space of the sealed container 9*a* into a feed chamber 9*b* and a permeation chamber 9*c*. The separation membrane 9*d* is made of a known membrane having high solubility coefficient and high diffusion coefficient for fuel components such that the separation membrane 9*d* can selectively allow the fuel components to pass therethrough and substantially prevents air components from passing therethrough. The feed chamber 9*b* of the separation membrane module 9 is connected to the fuel tank 1 via a second vapor pipe 16. The second vapor pipe 16 is provided with a second vapor pipe valve 26 as switching means for switching between a communicating condition and a shut-off condition of the second vapor pipe 16. The second vapor pipe valve 26 is composed of a solenoid valve controlled by the ECU 35, and is usually closed.

The feed chamber 9*b* of the separation membrane module 9 is connected with an end of a diluted gas pipe 17 for flowing diluted gas that dose not pass through the separation membrane 9*d* and remains in the feed chamber 9*b*. The other end of the diluted gas pipe 17 is connected to the adsorbent canister 3. The diluted gas pipe 17 is provided with a pressure regulator 27. The pressure regulator 27 is composed of a one-way valve allowing gas to flow in a specific direction from the separation membrane module 9 toward the adsorbent canister 3. When pressure higher than a predetermined pressure acts on the pressure regulator 27 in the specific direction, the pressure regulator 27 opens. On the other hand, the permeation chamber 9*c* of the separation membrane module 9 is connected with an end of a concentrated gas pipe 18 for flowing concentrated gas that has passed through the separation membrane 9*d* and is concentrated in the separation membrane module 9. The other end of the concentrated gas pipe 18 is connected to the recovery pipe 15 between the adsorbent canister 3 and the recovery pipe valve 25. The concentrated gas pipe 18 is provided with a check valve 36 preventing gas flow from the recovery pipe 15 toward the separation membrane module 9.

In the fourth embodiment, the first vapor pipe valve 21, the recovery pipe valve 25 and the second vapor pipe valve 26 divide the fuel vapor treating apparatus into the first area including the fuel tank 1 and the second area including the adsorbent canister 3. Accordingly, in the fourth embodiment, each of the first vapor pipe valve 21, the recovery pipe valve 25 and the second vapor pipe valve 26 corresponds to the separation valve of this disclosure. The first area is composed of the fuel tank 1, a portion of the first vapor pipe 11 between the fuel tank 1 and the first vapor pipe valve 21, the aspirator 4, a portion of the branch pipe 14 between the aspirator 4 and the fuel supply control valve 24, a portion of the recovery pipe 15 between the aspirator 4 and the recovery pipe valve 25, and a portion of the second vapor pipe 16 between the fuel tank 1 and the second vapor pipe valve 26. Whereas, the second area is composed of the adsorbent canister 3, a portion of the first vapor pipe 11 between the adsorbent canister 3 and the first vapor pipe valve 21, a portion of the air communication pipe 12 between the adsorbent canister 3 and the air communication pipe valve 22, a portion of the recovery pipe 15 between the adsorbent canister 3 and the recovery pipe valve 25, the separation membrane module 9, a portion of the second vapor pipe 16 between the separation membrane module 9 and the second vapor pipe valve 26, the diluted gas pipe 17, and the concentrated gas pipe 18.

In the fourth embodiment, when the internal pressure of the first area including the fuel tank 1 becomes equal to or higher than the predetermined value during refueling or during parking, the ECU 35 outputs signal for opening the first vapor pipe valve 21 in order to release pressure from the fuel tank 1 in the same manner as the first to third embodiments. When the fuel pump 2 is activated after starting the engine, the fuel supply control valve 24 and the recovery pipe valve 25 are opened in order to return the fuel vapor trapped in the adsorbent canister 3 into the fuel tank 1 via the aspirator 4 in the same manner as the third embodiment. In addition, when the engine is stopped, the ECU 35 outputs signals for closing the fuel supply control valve 24 and the recovery pipe valve 25, and thus generation of negative pressure in the aspirator 4 stops as the same manner as the third embodiment. In the fourth embodiment, when the fuel pump 2 is activated after starting the engine, the ECU 35 outputs signal for opening the second vapor pipe valve 26 in addition to the fuel supply control valve 24 and the recovery pipe valve 25. Accordingly, it is able to treat fuel vapor vaporized in the fuel tank 1 while recovering the fuel vapor trapped in the adsorbent canister 3.

When the second vapor pipe valve 26 is opened, fuel vapor-containing gas flows through the second vapor pipe 16 into the feed chamber 9*b* of the separation membrane module 9. Then, the fuel vapor in the fuel vapor-containing gas selectively passes through the separation membrane 9*d* such that the fuel vapor is concentrated in the permeation chamber 9*c*. In this state, negative pressure from the aspirator 4 acts on the permeation chamber 9*c* such that there is a difference between internal pressure of the feed chamber 9*b* and that of the permeation chamber 9*d* across the separation membrane 9*d*, so that it is able to efficiently isolate the fuel vapor. The concentrated gas that has passed through the separation membrane 9*d* and has been concentrated in the permeation chamber 9*d* flows through the concentrated gas pipe 18 and the recovery pipe 15 and then is discharged from the aspirator 4 into the fuel tank 1. On the other hand, the diluted gas mainly containing air that has not passed through the separation membrane 9*d* flows through the diluted gas pipe 17 to the adsorbent canister 3 as desorption gas. Accordingly, it is able to facilitate desorption of the fuel vapor from the adsorbent C in the adsorbent canister 3. In this state, the pressure regulator 27 keeps negative pressure in the adsorbent canister 3. If the internal pressure of the fuel tank 1 becomes negative pressure, i.e., below the atmospheric pressure, the pressure regulator 27 and the check valve 36 prevent reverse flow of the gas. When the engine is stopped, the fuel supply control valve 24, the recovery pipe valve 25 and the second vapor pipe valve 26 are simultaneously closed.

In the fourth embodiment, the leak testing is performed according to the flow chart in FIG. 2 in the same manner as the first to third embodiments.

Figure 13:
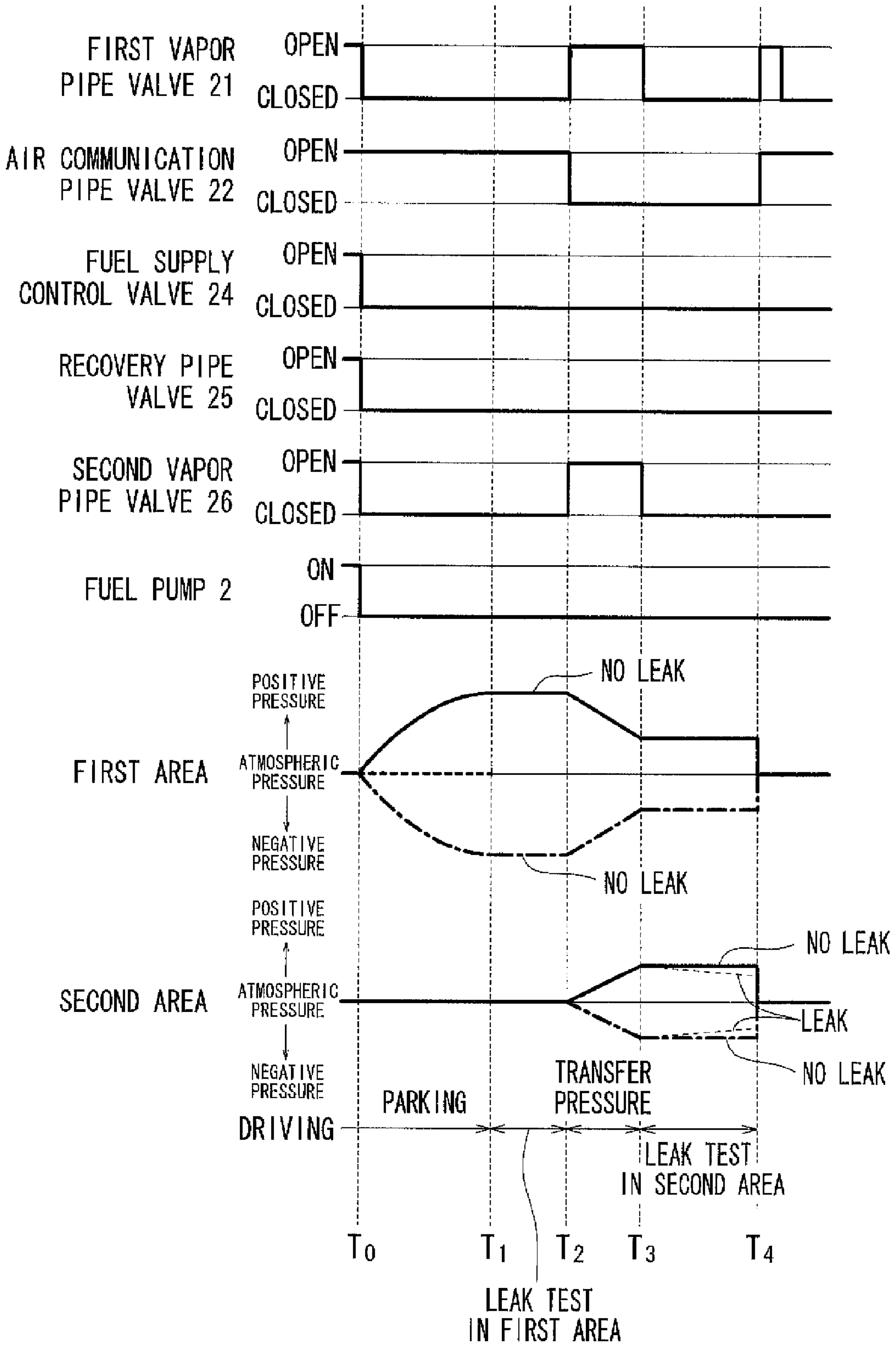
FIG. 13 is a graph showing changes in the internal pressures and valve opening-closing timings during the leak testing in a condition that the internal pressure of the fuel tank is beyond a predetermined range in the fourth embodiment.

A case that the internal pressure of the first area is beyond the predetermined range in the fourth embodiment will be described. As shown in FIG. 13, in the case that the absolute value of the differential pressure between the internal pressure of the first area including the fuel tank 1 and the atmospheric pressure is equal to or higher than the predetermined value, the fuel supply control valve 24 and the recovery pipe valve 25 are open during the leak testing (after point T1) in the similar manner as the third embodiment. After leak testing in the first area, the ECU 35 outputs signal for opening the first vapor pipe valve 21 and the second vapor pipe valve 26 in order to transfer pressure to the second area (point T2). Thus, it is able to transfer pressure from the first area to the second area quickly. For the leak testing in the second area, the ECU 35 outputs signal for closing the first vapor pipe valve 21 and the second vapor pipe valve 26 (point T3). For releasing pressure after leak testing in the second area, the second vapor pipe valve 26 is not opened whereas the first vapor pipe valve 21 is opened (point T4). Other configurations are same as those of the first to third embodiments.

Figure 14:
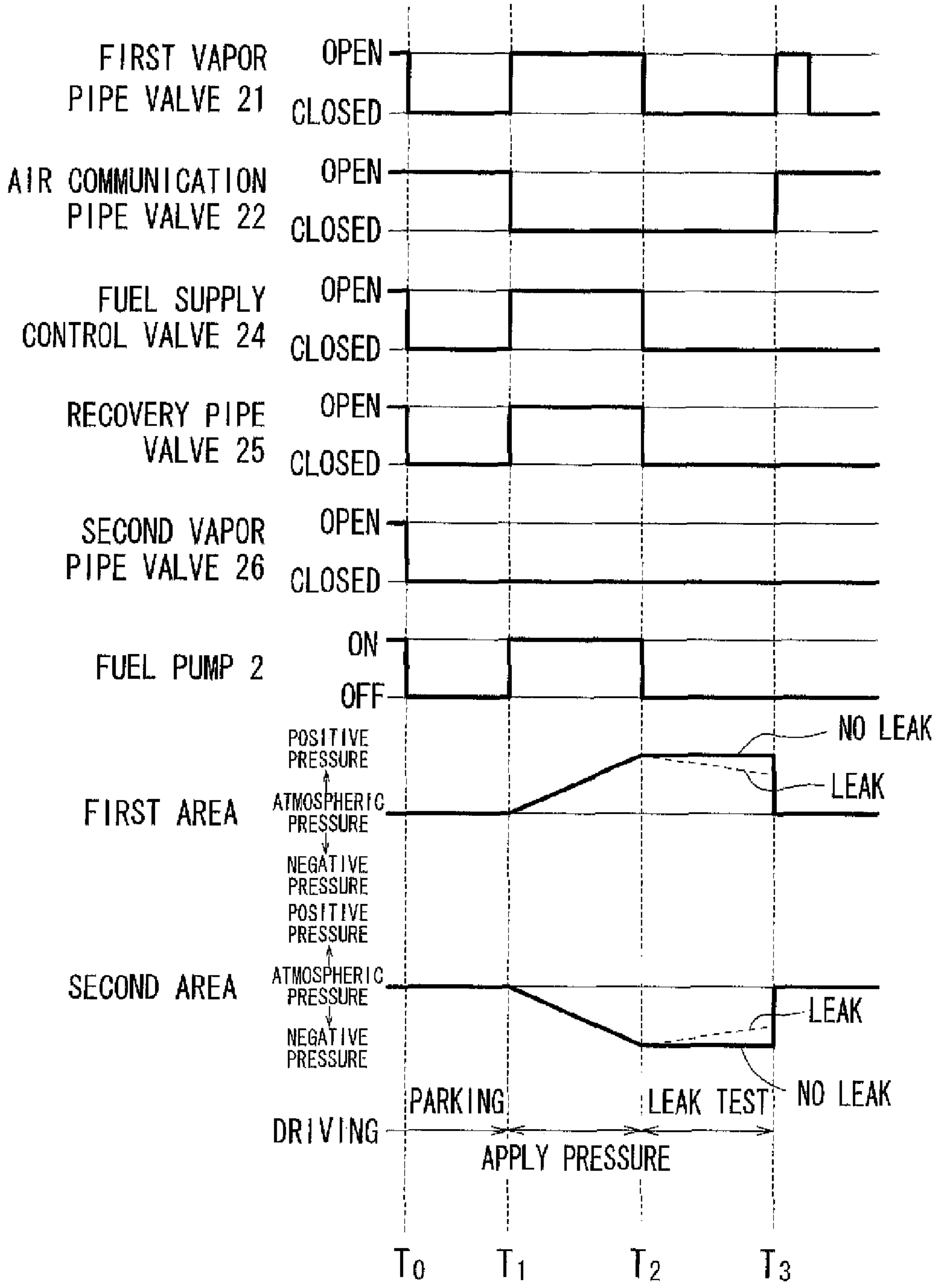
FIG. 14 is a graph showing changes in the internal pressures and valve opening-closing timings during the leak testing in a condition that the internal pressure of the fuel tank is within the predetermined range in the fourth embodiment.

A case that the internal pressure of the first area is within the predetermined range in the fourth embodiment will be described. In the case that the absolute value of differential pressure between the internal pressure of the first area including the fuel tank 1 and the atmospheric pressure is lower than the predetermined value, the leak test is performed in the substantially same manner as the third embodiment. However, as shown in FIG. 14, the second vapor pipe valve 26 is closed during the leak testing (after point T1).

Therefore, in the first to fourth embodiments, because the leak testing can be carried out regardless of whether the engine is running, it is able to perform the leak testing at any time.

Some additional examples will be described below. The first pressure sensor 8 for measuring the internal pressure of the first area can be mounted on any one of the first vapor pipe 11, the branch pipe 14, the recovery pipe 15 and the second vapor pipe 16 in the first area instead of the fuel tank 1. And, a plurality of pressure sensors can be provided in the first area for measuring the internal pressure of the first area. The second pressure sensor 9 for measuring the internal pressure of the second area can be mounted on any one of the adsorbent canister 3, the separation membrane module 9, the first vapor pipe 11, the purge pipe 13, the recovery pipe 15, the second vapor pipe 16, the diluted gas pipe 17 and the concentrated gas pipe 18 in the second area instead of the air communication pipe 12. And, a plurality of pressure sensors can be provided in the second area for measuring the internal pressure of the second area. Further, each of the described embodiments has the first pressure sensor 8 and the second pressure sensor 9 separately, however, it is possible to use one pressure sensor by switching a first mode for measuring the internal pressure in the first area and a second mode for measuring the internal pressure in the second area.

Figure 15:
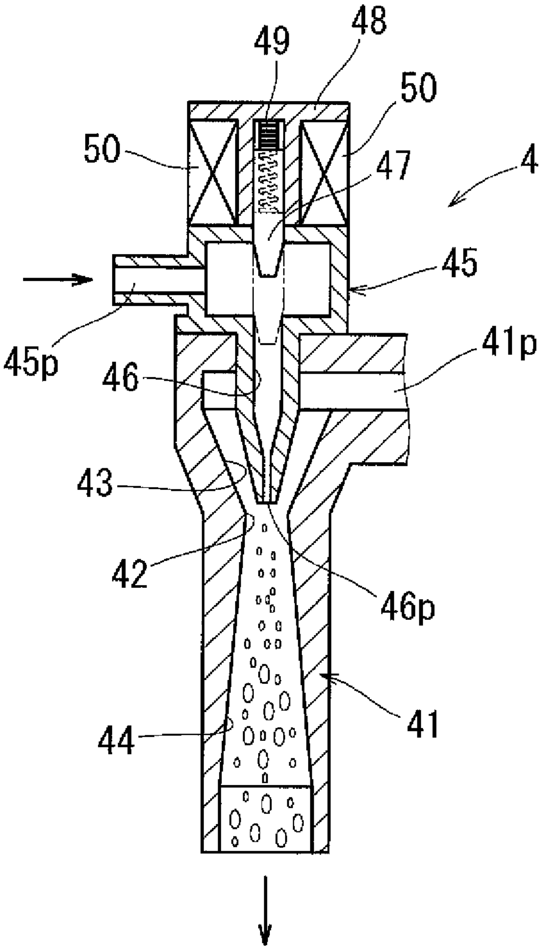
FIG. 15 is a vertical cross-sectional view of another aspirator.

A fuel supply control valve can be provided to the aspirator 4 instead of the fuel supply control valve 24 provided to the branch pipe 14. For example, as shown in FIG. 15, a needle valve 47 for controlling fuel injection from the nozzle body 46 can be disposed in the aspirator 4. In detail, a valve base 48 is mounted on the nozzle portion 45, and the needle valve 47 configured to open and close the nozzle body 46 is provided at a center of the valve base 48. The needle valve 47 is formed in a pin shape and can move in an axial direction of the aspirator 4. A spring 49 is disposed between the needle valve 47 and the valve base 48 such that the spring 49 biases the needle valve 47 in a closing direction, i.e., downwardly in FIG. 15. The valve base 48 has an electromagnet 50 around the needle valve 47. When the electromagnet 50 is provided with electricity, the needle valve 47 is moved in a valve opening direction, i.e., upwardly in FIG. 15 such that the nozzle body 46 is opened.

In the fourth embodiment, the first vapor pipe 21 and the second vapor pipe 26 are opened in order to transfer pressure from the first area to the second area, however, only the first vapor pipe valve may be opened.

In a case that teak testing is carried out after predetermined period of time from start of parking, the internal pressure can be measured after parking. In addition, it is able to carry out the leak testing when starting the engine by measuring the internal pressure during parking.

The invention claimed is:

1. A method for detecting a leak from a fuel vapor treating apparatus defining a first area including a fuel tank and a second area including an adsorbent canister, comprising:

hermetically closing the first area;

measuring internal pressure of the first area;

comparing an absolute value of differential pressure between the internal pressure of the first area and the atmospheric pressure with a predetermined value; and in a case that the absolute value is equal to or higher than the predetermined value, measuring the internal pressure of the first area in order to check for leaks from the first area based on changes in the internal pressure of the first area, fluidly communicating the first area with the second area in order to equilibrate internal pressures of the first area and the second area, hermetically closing the second area, and measuring the internal pressure of the second area in order to check for leaks from the second area based on changes in the internal pressure of the second area.

2. A method for detecting a leak from a fuel vapor treating apparatus defining a first area including a fuel tank and a second area including an adsorbent canister, comprising:

hermetically closing the first area;

measuring internal pressure of the first area;

comparing an absolute value of differential pressure between the internal pressure of the first area and the atmospheric pressure with a predetermined value; and in a case that the absolute value is lower than the predetermined value, hermetically closing the second area, applying pressure to the first and second areas from a pressure source, and measuring the internal pressures of the first and second areas in order to check for leaks from the first and second areas based on changes in the internal pressures of the first and second areas, respectively.

3. The method according to claim 2, wherein applying pressure includes applying positive pressure to the first area.

4. The method according to claim 3, wherein applying pressure includes applying negative pressure to the second area.

5. The method according to claim 4, wherein the pressure source is a vacuum pump.

6. The method according to claim 4, wherein the pressure source is an aspirator.

7. A method for detecting a leak from a fuel vapor treating apparatus defining a first area including a fuel tank and a second area including an adsorbent canister, comprising:

hermetically closing the first area;

measuring internal pressure of the first area;

comparing an absolute value of differential pressure between the internal pressure of the first area and the atmospheric pressure with a predetermined value;

in a case that the absolute value is equal to or higher than the predetermined value, measuring the internal pressure of the first area in order to check for leaks from the first area based on changes in the internal pressure of the first area; fluidly communicating the first area with the second area in order to equilibrate internal pressures of the first area and the second area; hermetically closing the second area; and measuring the internal pressure of the second area in order to check for leaks from the second area based on changes in the internal pressure of the second area; and in another case that the absolute value is lower than the predetermined value, hermetically closing the second area in a case that the absolute value is lower than the predetermined value, applying pressure to the first and second areas from a pressure source, measuring the internal pressures of the first and second areas in order to check for leaks from the first and second areas based on changes in the internal pressures of the first and second areas, respectively.

* * * * *